UNITED STATES PATENT OFFICE.

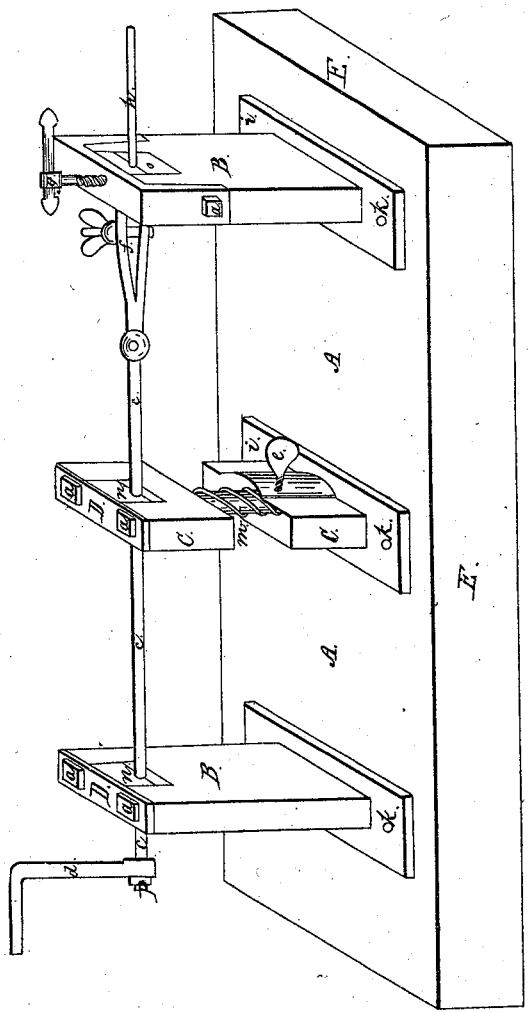

JOSEPH BLACKALL, OF ALBANY, NEW YORK.

MACHINE FOR CUTTING SCREWS.

Specification of Letters Patent No. 318, dated July 29, 1837.

*To all whom it may concern:*

Be it known that I, JOSEPH BLACKALL, of the city and county of Albany, in the State of New York, a citizen of the United States of America, have invented a new and useful improvement in the construction and adaptation to use of a screw-cutting machine or engine for making all kinds of screws and of every material of which screws are or may be made, and that the following is a description and specification thereof, viz.:

A plain bed of any required dimensions of either wood or metal is prepared upon the upper side of which are firmly secured three puppet heads or posts either of metal or wood made in the manner hereinafter described. The first or right hand puppet head as represented in the drawing accompanying and annexed to the specification is made with a suitable opening at the top to receive a pair of dies or screw cutters. On the sides of the opening there may be either grooves or side bars to keep the dies perfectly steady while in operation. The ends of the dies are made with corresponding grooves or side bars so as to fit truly to the opening in the puppet head. On the top of this puppet head is a cap made to extend across the head or top of the puppet head and extending far enough down on the front and rear of the puppet head to permit regulating screws to pass through the lower extremities of the cap into the puppet head to keep the cap firmly in the position and at the place required. On the center of the top of this cap a perpendicular screw is made to pass through with a lever passing through the upper end to give motion to the screw and thereby to depress or elevate the upper die or screw cutter so as to perform the operation required of cutting the screw. The center puppet head is constructed in an under and an upper section. The position of the upper section is maintained by means of a spindle, shaft or rod descending from it into a tube made through the under section. Around this spindle, shaft or rod a spiral spring is placed and extending to the bottom of the tube so that the shaft and upper section of the puppet head rests on the spiral screw and thereby the upper section when in operation yields to the position required by the mandrel or shaft that is made to work through a collar fixed in the top of the upper section across the top of the upper section a straight cap is placed secured by screws at each end for the purpose of keeping the collar under it in its proper position. In the lower section there is a screw passing into and against the rod from the upper section. By this the general elevation of the upper section is in some measure regulated. The third or left hand puppet head has an opening for a collar at the top with a like cap with the last for securing the position of the collar. A shaft or mandrel is then made of an appropriate size to pass through the collars of the center and left hand puppet head collars, extending far enough back of the third puppet head to permit the application of a crank, lever, wheel or pulley to give motion to the shaft or mandrel. It should also extend to about half way between the center and right hand puppet head. This end of the shaft or mandrel should be so constructed as to receive the end of a vise or tongs firmly and securely.

The chops or jaws of the vise or tongs are so made as to take in the head of a screw and to hold it firmly in position while the operation of cutting the screw is performed. This operation is performed by causing an uncut screw to be placed in the jaws of the vise or tongs firmly then forcing the shaft or mandrel far enough to permit the point to enter between the dies or screw cutters thereby bringing down the screw at the head or top of the right hand puppet head and forcing the upper die hard down upon the uncut screw you then by means of the crank, wheel or pulley attached to the other end of the shaft move the shaft or mandrel backward and forward increasing the pressure of the screw upon the die until the screw is perfectly cut when it is disengaged from the vise and is finished. The size and strength of the machine or engine is to be regulated by the size of the screw to be cut. It is adapted to cutting screws of every kind of metal, of bone, ivory, wood and all other materials of which screws can be made and the thread of the screw cut to any required shape and dimension. The accompanying and annexed drawing shows the relative proportions and construction of the machine or engine, but they can be varied at the pleasure of the maker. The shaft or mandrel should be made of iron or steel of an exact size so as perfectly to fit the two collars through which it has to pass and in which it operates. It must be made long enough to admit it to move endwise at least the distance of the length of the screw required to be cut. The shaft or mandrel should be made to move quite free and steady and easily in the collars and so as not to bind in the least. The shaft or mandrel should be in exact line with the center of the dies or cutters.

This engine can be operated by any of the ordinary powers either hand or manual, steam water or steam power. The degree of motion can be easily and readily regulated by the operator. And for greater and more particular certainty in the construction of the machine or engine reference is made to the drawing accompanying this specification and which drawing is furnished with references.

And I the said JOSEPH BLACKALL claim as my invention and improvement in said machine or engine as follows:

1. I claim the construction of the center puppet head.
2. Its division into two sections.
3. The spindle and tube or socket.
4. The upper and lower spiral springs.
5. The adjusting screw in the lower section of the puppet head.
6. The construction and combination of these parts in the manner hereinabove described and specified and particularly represented in the said drawing so that when the shaft is in operation it becomes a self-adjusting puppet head, and the rest, residue, and other parts of the said puppet heads and engine he does not claim.

JOSEPH BLACKALL.

Witnesses:
JAMES MAHER,
C. L. OSBORN.